(12) United States Patent
Barter et al.

(10) Patent No.: US 11,232,730 B2
(45) Date of Patent: Jan. 25, 2022

(54) PULSE HISTORY COMPENSATION FOR SCANNED LASER DISPLAYS

(71) Applicant: Microsoft Technology Licensing, LLC, Redmond, WA (US)

(72) Inventors: Thomas Hamish Barter, Seattle, WA (US); John Allen Tardif, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/859,971

(22) Filed: Apr. 27, 2020

(65) Prior Publication Data

US 2021/0335171 A1 Oct. 28, 2021

(51) Int. Cl.
*G09G 3/02* (2006.01)
*G02B 27/01* (2006.01)
*G02B 26/10* (2006.01)

(52) U.S. Cl.
CPC ........... *G09G 3/025* (2013.01); *G02B 26/105* (2013.01); *G02B 27/0172* (2013.01); *G02B 2027/014* (2013.01); *G02B 2027/0112* (2013.01); *G02B 2027/0178* (2013.01); *G09G 2320/0233* (2013.01); *G09G 2320/0242* (2013.01); *G09G 2320/0633* (2013.01); *G09G 2320/0646* (2013.01)

(58) Field of Classification Search
CPC ........... H04R 1/02; H04R 9/02; G06F 3/0488; G09G 3/025
See application file for complete search history.

(56) References Cited

U.S. PATENT DOCUMENTS

| 8,605,764 B1 * | 12/2013 | Rothaar | ............... H04N 9/3129 372/38.02 |
| 8,750,341 B2 * | 6/2014 | Bazzani | ............... H04N 9/3129 372/38.02 |
| 2006/0114271 A1 | 6/2006 | Takeda | |

(Continued)

FOREIGN PATENT DOCUMENTS

EP 2870509 A2 5/2015

OTHER PUBLICATIONS

"International Search Report and Written Opinion Issued in PCT Application No. PCT/US2021/023057", dated Jun. 30, 2021, 17 Pages.

*Primary Examiner* — Kevin M Nguyen
(74) *Attorney, Agent, or Firm* — Medley, Behrens & Lewis, LLC

(57) ABSTRACT

A display system comprises a current source, pulse circuitry, a pulsed laser, control circuitry, and a display surface. The pulse circuitry outputs a first pulse of electrical current based upon electrical current emitted by the current source. The pulsed laser emits first light based upon the first pulse, wherein luminance of the first light is based upon a first amplitude of the first pulse. The control circuitry generates an estimate of pulse history effects on second light that is to be emitted by the pulsed laser, the estimate is generated based upon a parameter of the first pulse and a desired luminance of the second light. The control circuitry causes the pulse circuitry to output a second pulse of electrical current based upon the estimate. Based upon the second pulse, the pulsed laser emits second light with the desired luminance.

20 Claims, 9 Drawing Sheets

(56) References Cited

U.S. PATENT DOCUMENTS

2007/0086495 A1  4/2007  Sprague et al.
2009/0028199 A1  1/2009  Brown et al.
2009/0175302 A1* 7/2009  Bazzani .............. H01S 5/06209
                                              372/26

* cited by examiner

PULSE HISTORY COMPENSATION FOR SCANNED LASER DISPLAYS

BACKGROUND

A scanned laser display is a type of display technology whereby light emitted from lasers is projected onto a display surface in a scanning manner, thereby forming visual images. More specifically, in a scanned laser display, a pulse of electrical current is provided to a pulsed laser (e.g., a red, green, or blue pulsed laser), and the pulsed laser emits light (having a certain luminance) towards the display surface. A mirror included in a microelectromechanical system (MEMs) directs the light towards a point on the display surface, wherein the light at the point is a pixel in imagery that is presented on the display surface. Luminance of the light emitted by the pulsed laser is based upon an amplitude of the pulse of electrical current. In comparison to other display technologies, scanned laser displays have low power requirements, are capable of high levels of luminance, emit little electromagnetic radiation, can be packaged in small form factors, and present visual images that tend not to strain the human eye. As such, scanned laser displays are useful in lightweight head mounted displays, such as augmented reality (AR) or virtual reality (VR) headsets.

Due to the inherent non-linear behavior of lasers, precise control of luminance in a scanned laser display is challenging. More specifically, pulse history effects present challenges to precise control of luminance. Pulse history effects cause luminance of light emitted by the pulsed laser to be affected by parameters of each pulse of electrical current previously provided to the pulsed laser. Thus, a scanned laser display may output a pulse of electrical current having an amplitude that, in the absence of pulse history effects, is expected to produce light of a first luminance when provided to a pulsed laser included in the scanned laser display, but, due to pulse history effects, the actual light produced by the pulsed laser may have a second luminance that is different from the first luminance. With more particularity, a pulsed laser initially biased below a threshold has a delayed optical response to an electrical current driven above the threshold. The net effect of this "turn-on delay" is a decrease in luminance of the light emitted by the pulsed laser, and therefore decreased luminance of a pixel. Due to electrooptical effects in the pulsed laser, closely preceding a pulse of electrical current with another pulse that is provided to the pulsed laser can have this "turn-on delay" reduced, leading to the laser emitting light with more luminance than would be emitted if the pulse of electrical current were not closely preceded with another pulse of electrical current. Pulse history effects may cause a scanned laser display to emit light that is not of a desired luminance, and therefore the resultant pixels on the display surface appear brighter or dimmer than what is desired. Because color of a pixel is a function of combined light emitted by several pulsed lasers, pulse history effects may also cause a scanned laser display to depict light that is a different color than what is desired.

SUMMARY

The following is a brief summary of subject matter that is described in greater detail herein. This summary is not intended to be limiting as to the scope of the claims.

Described herein are various technologies pertaining to scanned laser displays. With more specificity, a display system is described herein that is configured to generate an estimate of pulse history effects on light that is to be emitted by a pulsed laser based upon: 1) a desired luminance; and 2) a parameter of a previous pulse of electrical current that was provided to the pulsed laser to cause the pulsed laser to previously emit light. The display system is further configured to output pulses of electrical current that account for the pulse history effects such that the light emitted by the pulsed laser has the desired luminance.

The display system comprises a current source, pulse circuitry, a pulsed laser, control circuitry, and a display surface. The current source emits electrical current that is received by the pulse circuitry. The control circuitry controls the pulse circuitry to output a first pulse of electrical current based upon the electrical current emitted by the current source. The pulsed laser receives the first pulse of electrical current from the pulse circuitry and emits first light towards the display surface in connection with presenting imagery (e.g., video imagery) on the display surface, wherein luminance of the first light is based upon an amplitude of the first pulse. A first pixel is illuminated on the display surface based upon the first light, where brightness of the first pixel is based upon the luminance of the first light emitted by the pulsed laser, and further wherein the first pixel is part of the imagery (e.g., the first pixel is in a frame of video imagery).

The control circuitry generates an estimate of pulse history effects on second light that is to be emitted by the pulsed laser subsequent to the first light being emitted by the pulsed laser. The estimate is generated based upon a parameter of the first pulse and a desired luminance of the second light. In an example, the parameter may be a time between a trailing edge of the first pulse of electrical current and a leading edge of a second pulse of electrical current that is to be output by the pulse circuitry (i.e., a pulse spacing between the first pulse and the second pulse). Additionally or alternatively, the parameter may be or include a temperature at a junction of the pulsed laser, the amplitude of the first pulse, a rise time of the first pulse, and/or a fall time of the first pulse. The estimate may also be generated based upon parameters of pulses of electrical current output by the pulse circuitry prior to the first pulse.

The control circuitry controls the pulse circuitry to output the second pulse of electrical current based upon the estimate of the pulse history effects on the second light that is to be emitted by the pulsed laser. The pulsed laser receives the second pulse and emits the second light towards the display surface, wherein the second light has the desired luminance (wherein luminance of the second light is based upon an amplitude of the second pulse). A second pixel is illuminated on the display surface based upon the second light, wherein brightness of the second pixel is based upon the luminance of the second light emitted by the pulsed laser, and further wherein the second pixel is part of the imagery (e.g., the second pixel may be adjacent the first pixel in the frame of the video imagery).

In an exemplary embodiment, the control circuitry generates the estimate of the pulse history effects based upon the pulse spacing between the first pulse and the second pulse, the temperature at the junction of the pulsed laser, and the desired luminance of the second light. With more specificity, the control circuitry accesses a three-dimensional lookup table that is stored in memory accessible to the control circuitry. The three-dimensional lookup table comprises interpolation factors that are indexed by pulse spacing, temperature, and luminance values. The control circuitry identifies an interpolation factor in the interpolation factors using the pulse spacing between the first pulse and the second pulse, the (current) temperature at the junction of the pulsed laser, and the desired luminance of the second light.

In an example, the control circuitry performs an interpolation between a first curve and a second curve stored in the memory using the identified interpolation factor. The first curve and the second curve include values that are indexed in two dimensions: electrical current and luminance. The first curve is indicative of amplitudes of pulses of electrical current that, when provided to the pulsed laser under first operating conditions (e.g., low junction temperature and small pulse spacing), result in the pulsed laser emitting light having first luminances, while the second curve is indicative of amplitudes of pulses of electrical current that, when provided to the pulsed laser under second operating conditions (e.g., high junction temperature and large pulse spacing), result in the pulsed laser emitting light having second luminances. Based upon the interpolation, the control circuitry identifies an amplitude of the second electrical pulse that results in the pulsed laser emitting light with the desired luminance. Thus, when the pulsed laser is provided with the second pulse of electrical current, the pulsed laser emits the second light with the desired luminance.

The above-described display system exhibits various advantages over conventional scanned laser displays. First, by correcting for pulse history effects, the display system enables pixels on the display surface to be displayed with desired luminance and color. Second, the above-described display system is computationally efficient and can be incorporated into an active video system, such as one found in an augmented reality (AR) or virtual reality (VR) headset.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
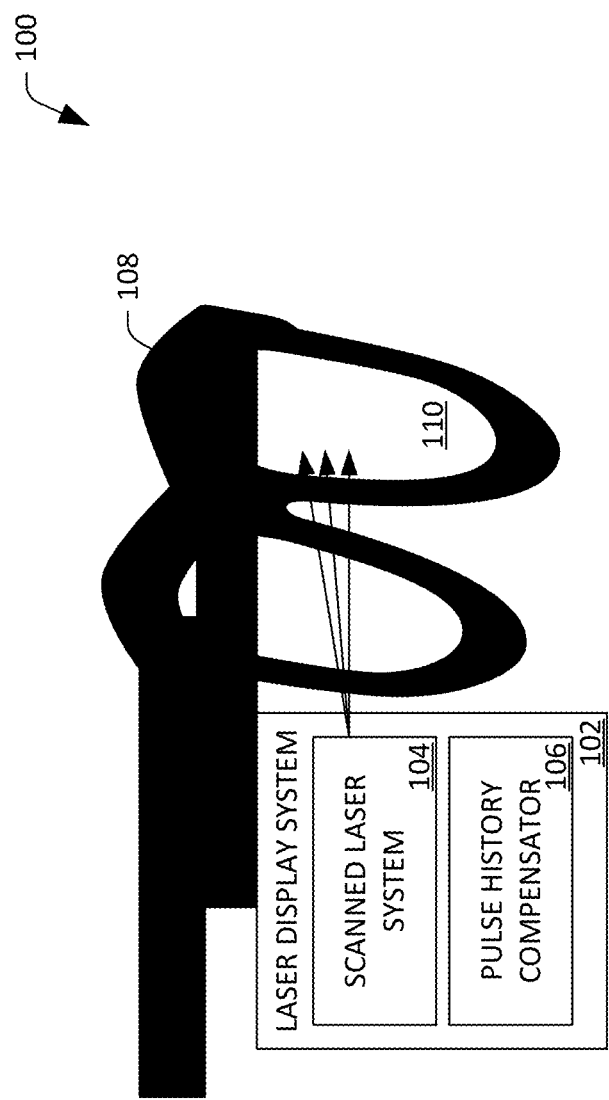
FIG. 1 is a functional block diagram of a head mounted display that corrects for pulse history effects when outputting video imagery.

Various technologies pertaining to scanned laser displays are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Pulse history effects present challenges to precise control of luminance in a scanned laser display. More specifically, pulse history effects cause luminance of light emitted by a pulsed laser in a scanned laser display to be affected by parameters of each pulse of electrical current previously provided to the pulsed laser. Thus, a scanned laser display may output a pulse of electrical current having an amplitude that, in the absence of pulse history effects, is expected to produce light of a first luminance when provided to a pulsed laser included in the scanned laser display, but, due to pulse history effects, the actual light produced by the pulsed laser may have a second luminance that is different from the first luminance. The resultant pixels on a display surface of the scanned laser display may thus appear brighter or dimmer than what is desired. Because color of a pixel may be a function of combined light emitted by several pulsed lasers, pulse history effects may also cause a scanned laser display to depict light that is a different color than what is desired.

To address the aforementioned problem relating to precise control of luminance in a scanned laser display, a display system is described herein that is configured to generate an estimate of pulse history effects on light that is to be emitted by a pulsed laser based upon: 1) a desired luminance; and 2) a parameter of a previous pulse of electrical current that was provided to the pulsed laser to cause the pulsed laser to previously emit light. In an example, the parameter may include a time between a trailing edge of a first pulse of electrical current and a leading edge of a second pulse of electrical current that is to be output (i.e., a pulse spacing between the first pulse and the second pulse), as well as a temperature at a junction of the pulsed laser. Other parameters are contemplated as well. The display system is further configured to output pulses of electrical current that account for the pulse history effects such that the light emitted by the pulsed laser has the desired luminance. The resultant pixels on a display surface of the display system thus appear with the desired luminance and color.

With reference now to FIG. 1, an exemplary display system 100 that corrects for pulse history effects when outputting video imagery is illustrated. The display system 100 comprises a laser display system 102. The laser display system 102 includes a scanned laser system 104. The scanned laser system 104 is configured to emit light based upon a pulses of electrical current, wherein luminance of the light is based upon amplitudes of the pulses of electrical current. The laser display system 102 further includes a pulse history compensator 106. As will be described in greater detail below, the pulse history compensator 106 is configured to generate an estimate of pulse history effects on light that is to be output by the scanned laser system 104, wherein the estimate is based upon a desired luminance of the light and a parameter of a previous pulse of electrical current based upon which the scanned laser system 104 previously emit light. Thus, the scanned laser system 104 and the pulse history compensator 106 work in conjunction with one another to cause light to be emitted by the scanned laser system 104 that compensates for the pulse history effects such that the light has the desired luminance. The display system 100 further includes a headset 108 worn by a user (not shown in FIG. 1). The headset 108 includes a display surface 110. Light emitted from the scanned laser system 104 is projected (illustrated by arrows in FIG. 1) towards points on the display surface 110, wherein the light at the points are pixels in imagery presented on the display surface 110.

Figure 2:
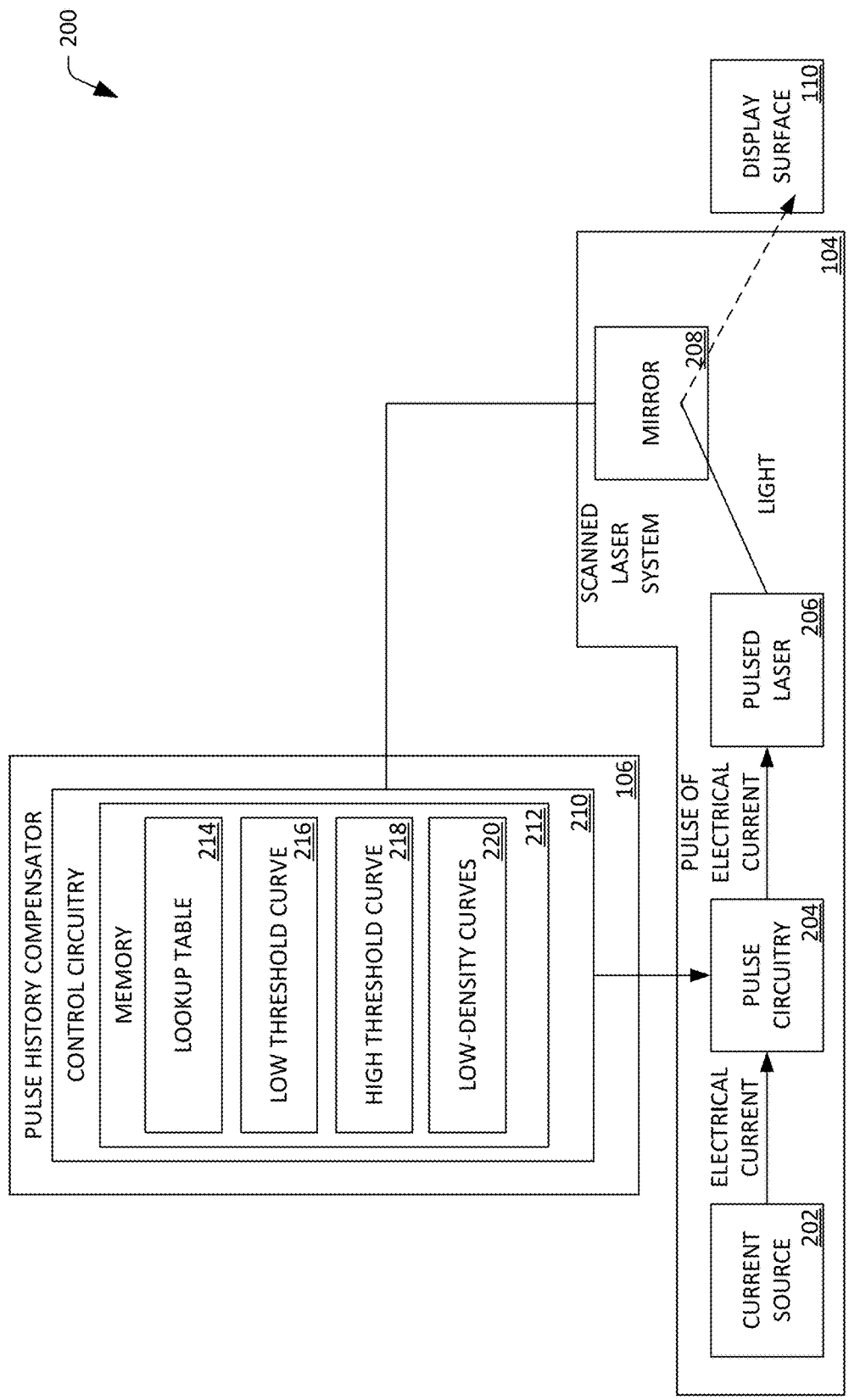
FIG. 2 is a functional block diagram of an exemplary display system that compensates for pulse history effects when outputting video imagery.

With reference to FIG. 2, an exemplary display system 200 that corrects for pulse history effects when outputting video imagery is illustrated. The display system 200 may include or be part of a head-mount display worn on a head of a user (e.g., the headset 108), such as a virtual reality (VR) headset or an augmented reality (AR) headset. In another example, the display system 200 may be included in a heads-up display, such as one found in a vehicle, where imagery is projected onto a windshield.

The display system 200 comprises the scanned laser system 104. The scanned laser system 104 includes a current source 202 that is configured to emit electrical current. The display system 200 further includes pulse circuitry 204 that is electrically coupled to the current source 202. The pulse circuitry 204 is configured to output pulses of electrical current based upon electrical current emitted by the current source 202 that is received by the pulse circuitry 204, and therefore the pulse circuitry 204 can include capacitors and other circuitry that can be configured to cause the pulse circuitry 204 to emit electrical pulses with desired pulse shape, amplitude, time between pulses, etc.

Figure 3:
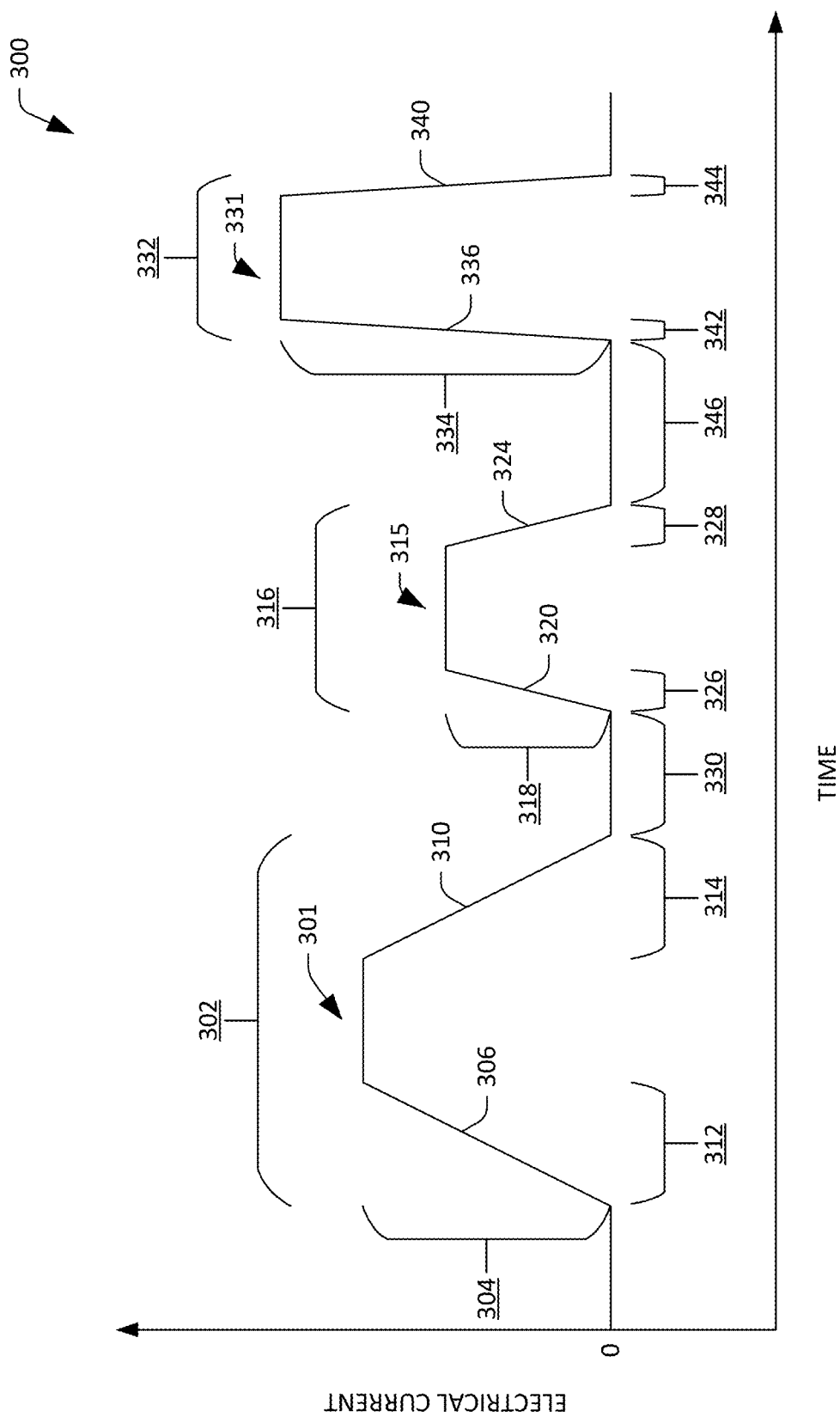
FIG. 3 is a plot illustrating exemplary pulses of electrical current.

With reference now briefly to FIG. 3, an exemplary plot 300 of pulses of electrical current (electrical pulses) that can be output by the pulse circuitry 204 is illustrated. In the plot 300, the x-axis corresponds to time and the y-axis corresponds to amplitude of electrical current. The plot 300 depicts a first electrical pulse 301. The first electrical pulse 301 has an amplitude represented by reference numeral 304. As depicted in the plot 300, the first electrical pulse 301 comprises a leading edge 306 at which the electrical current rises from a base level (e.g., 0 A) to the amplitude 304, a pulse width 302, and a trailing edge 310 where the electrical current decreases from the amplitude 304 to the base level. As depicted in the plot 300, a rise time 312 for the first electrical pulse 301 is an amount of time for the amplitude of the electrical current to rise from the base level to the amplitude 304, whereas a fall time 314 for the first electrical pulse 301 is an amount of time for the amplitude of the electrical current to fall from the amplitude 304 to the base level.

The plot 300 additionally depicts a second electrical pulse 315 that has an amplitude represented by reference numeral 318, which may be different than the amplitude 304 of the first electrical pulse 301. Similar to the first electrical pulse 301, the second electrical pulse 315 comprises a leading edge 320, a pulse width 316, and a trailing edge 324 (which may respectively be different from the leading edge 306, pulse width 302, and trailing edge 310 of the first electrical pulse 301). The second electrical pulse 315 has a rise time 326 and a fall time 328 (which may respectively be different from the rise time 312 and the fall time 314 of the first electrical pulse 301). Furthermore, the plot 300 illustrates a first pulse spacing 330 between the first electrical pulse 301 and the second electrical pulse 315, wherein the first pulse spacing 330 is an amount of time between the (end of the) trailing edge 310 of the first electrical pulse 301 and the (beginning of the) leading edge 320 of the second electrical pulse 315.

The plot 300 further depicts a third electrical pulse 331 that has an amplitude represented by reference numeral 334, which may be different than the amplitude 304 of the first electrical pulse 301 and/or the amplitude 318 of the second electrical pulse 315. The third electrical pulse 331 comprises a leading edge 336, a pulse width 338, and a trailing edge 340 (which may respectively be different from parameters of the first electrical pulse 301 and/or the second electrical pulse 315). The third electrical pulse 331 has a rise time 342 and a fall time 344 (which may be different from the rise times and fall times of the electrical pulses 301 and 315). Furthermore, the plot 300 illustrates a second pulse spacing 346 between the second electrical pulse 315 and the third electrical pulse 331, wherein the second pulse spacing 346 is an amount of time between the (end of the) trailing edge 324 of the second electrical pulse 315 and the (beginning of the) leading edge 336 of the third electrical pulse 331. The pulse spacing 346 may be different from the pulse spacing 330 (e.g., due to geometries corresponding to elements of the system 200).

Returning to FIG. 2, the scanned laser system 104 of the display system 200 further includes a pulsed laser 206 that is electrically coupled to the pulse circuitry 204. The pulsed laser 206 is configured to receive pulses of electrical current output by the pulse circuitry 204, and is further configured to emit light (i.e., a laser beam) towards the display surface 110 based upon the pulses of electrical current received from the pulse circuitry 204. With respect to a pulse received by the pulsed laser 206, luminance of light emitted by the pulsed laser 206 is based upon an amplitude of the pulse. In an embodiment, the pulsed laser 206 may be a laser that is configured to emit red light ("a red laser"), a laser that is configured to emit green light ("a green laser"), or a laser that is configured to emit blue light ("a blue laser"). Although not depicted in FIG. 2, it is to be understood that the scanned laser system 104 may include a plurality of pulsed lasers that comprise multiple red lasers, green lasers, and/or blue lasers. Furthermore, it is to be understood that the scanned laser system 104 may combine red light, green light, and blue light emitted from the plurality of pulsed lasers in order to display many different colors (e.g., purple, orange, yellow, etc.).

The display surface 110 is configured to receive the light emitted by the pulsed laser 206. When perceived by an eye of a user of the display system 200, a pixel on the display surface 110 is based upon the light emitted by the pulsed laser 206 (which in turn is based upon the pulse output by the pulse circuitry 204). For instance, the pixel may be part of a frame of video imagery that is presented on the display surface 110. The display surface 110 may be a transparent material or a semi-transparent material (e.g., glass, clear plastic), and may be positioned a short distance (e.g., 1-5 centimeters) from the eye of the user.

In an embodiment, the scanned laser system 104 includes a microelectromechanical system (MEMs) that comprises a mirror 208. The mirror 208 is configured to reflect the light emitted by the pulsed laser 206 onto a location on the display surface 110. The mirror 208 may be adjusted to reflect light emitted by the pulsed laser 206 to different locations on the display surface 110 over time. For instance, at a first point in time, the mirror 208 may be positioned to direct light emitted by the pulsed laser 206 to a first location on the display surface 110, and at a second point in time, the mirror 208 may be positioned to direct light emitted by the pulsed laser 206 to a second location on the display surface 110.

The display system 200 further comprises the pulse history compensator 106. In the embodiment illustrated in FIG. 2, the pulse history compensator 106 is an application-specific integrated circuit (ASIC) and includes control circuitry 210 that is electrically coupled to the pulse circuitry 204. The control circuitry 210 is configured to control the pulse circuitry 204, such that a pulse emitted by the pulse circuitry 204 has a desired amplitude, pulse width, rise time, fall time, etc.

The control circuitry 210 is further configured to generate an estimate of pulse history effects on light that is to be emitted by the pulsed laser 206 and controls the pulse circuitry 204 based upon the estimate of the pulse history effects. The control circuitry 210 comprises memory 212. In an exemplary embodiment, a lookup table 214 is stored in the memory 212, wherein the lookup table 214 comprises interpolation factors. As will be described in greater detail below, the control circuitry 210 can identify an interpolation factor from the lookup table 214 based upon a parameter of a pulse previously emitted by the pulse circuitry 204, and can control the pulse circuitry 204 (with respect to a pulse that is to be emitted by the pulse circuitry 204) based upon the interpolation factor, wherein controlling the pulse circuitry 204 based upon the interpolation factor is undertaken to compensate for pulse history effects on light that is to be emitted by the pulsed laser 206 (based upon the pulse that is to be emitted by the pulse circuitry 204). The interpolation factors in the lookup table 214 may be experimentally determined prior to operation of the display system 200. Interpolation factors in the lookup table 214 are indexed by luminance of light that is to be emitted by the pulsed laser 206 and a parameter (or several parameters) of a pulse of electrical current that has been previously output by the pulse circuitry 204 in connection with causing light to be previously emitted by the pulsed laser 206 towards the display surface 110. Thus, given a desired luminance and the parameter of the (previous) pulse, the control circuitry 210 can identify an interpolation factor from amongst the interpolation factors in the lookup table 214.

It is to be understood that values along a dimension in the lookup table 214 may be stepped (i.e., not continuous). For instance, when interpolation factors are at least partially indexed by pulse spacing values, and possible values for pulse spacing range from 0.7 ns to 14.7 ns, a step size of 1.0 ns may be utilized. Thus, along a pulse spacing dimension of the lookup table 214, interpolation factors can be indexed by values of pulse spacing of 0.7 ns, 1.7 ns, 2.7 ns, . . . , 13.7 ns, and 14.7 ns. In the event that the desired luminance and/or the parameter of the previous pulse do not exactly match a value by which an interpolation factor is indexed in the lookup table 214, the control circuitry 210 may round the desired luminance and/or the parameter of the previous pulse to the nearest value in the lookup table 214 by way of which interpolation factors are indexed. For instance, following the previous example, if a received value for pulse spacing is 2.5 ns, the control circuitry 210 may round such value to 2.7 ns and identify an interpolation factor in the lookup table 214 based upon the rounded 2.7 ns value. In another example, the control circuitry 210 can interpolate between values.

In an embodiment, parameters of the previous pulse upon which interpolation factors in the lookup table 214 are indexed include: (1) pulse spacing; and (2) a (current) temperature at a junction of the pulsed laser 206. Further, the interpolation factors can be indexed by luminance values. Thus, in an example, with respect to an electrical pulse that is to be emitted by the pulse circuitry 204, the control circuitry 210 can receive or compute the following values: 1) pulse spacing between a most recent electrical pulse emitted by the pulse circuitry 204 and the electrical pulse that is to be emitted by the pulse circuitry 204 (e.g., an amount of time between the trailing edge of the most recent pulse emitted by the pulse circuitry 204 and the leading edge of the pulse that is to be emitted by the pulse circuitry 204); 2) a temperature at the junction of the pulsed laser 206; and 3) desired luminance of light to be emitted by the pulsed laser 206 based upon the electrical pulse to be emitted by the pulse circuitry 204. The control circuitry 210 can then identify an interpolation factor in the lookup table 214 based upon the aforementioned three values. The control circuitry 210 may estimate the temperature at the junction of the pulsed laser 206 based upon a temperature of an area external to the pulsed laser 206 (and a temperature model that can output an estimated temperature of the junction of the pulsed laser 206 based upon the temperature of the area that is external to the pulsed laser 206).

In another example, interpolation factors in the lookup table 214 may additionally or alternatively be indexed by amplitude(s) of previous pulse(s). Thus, it is also to be understood that parameters by which interpolation factors are indexed in the lookup table 214 need not be limited to parameters of a pulse that was most recently emitted by the pulse circuitry 204. For instance, interpolation factors in the lookup table 214 may be indexed by values for parameters of two pulses of electrical current that immediately precede a pulse of electrical current that is to be output by the pulse circuitry 204. Hence, interpolation values in the lookup table 214 may be indexed in five dimensions: luminance, pulse spacing between a pulse that is to be emitted by the pulse circuitry 204 and a pulse most recently emitted by the pulse circuitry 204, temperature at the junction, pulse spacing between the pulse most recently emitted by the pulse circuitry 204 and a pulse emitted by the pulse circuitry 204 immediately prior to such pulse, and a previously determined temperature at the junction. Thus, it is to be understood that the lookup table 214 may be a N+1 dimensional table, where N is a number of parameters of previous pulse(s), and where dimensions correspond to the parameters and luminance of light that is to be emitted by the pulsed laser 206.

The memory 212 further comprises a low threshold curve 216 and a high threshold curve 218 that have been experimentally generated prior to operation of the display system 200. The control circuitry 210 may utilize the above-referenced interpolation factor along with the low threshold curve 216 and the high threshold curve 218 in order to generate an estimate of pulse history effects on light that is to be emitted by the pulsed laser 206. With more specificity, the control circuitry 210 can interpolate between the low threshold curve 216 and the high threshold curve 218 using the interpolation factor in order to identity an amplitude of an electrical pulse that, when provided to the pulsed laser 206 (and based upon parameters of at least one previously emitted pulse), causes the pulsed laser 206 to output light of the desired luminance.

The low threshold curve 216 and the high threshold curve 218 comprise a plurality of points that are indexed in two dimensions. More specifically, a first dimension of the low threshold curve 216 corresponds to luminance of light emitted by the pulsed laser 206 (or a similar pulsed laser) under first conditions (e.g., low junction temperature and small pulse spacing). A second dimension of the low threshold curve 216 corresponds to amplitudes of pulses that result in the pulsed laser 206 (or the similar pulsed laser) producing light with the luminance under the first conditions. A first dimension of the high threshold curve 218 corresponds to luminance of light emitted by the pulsed laser 206 (or a similar pulsed laser) under second conditions (e.g., high junction temperature and large pulse spacing). A second dimension of the high threshold curve 218 corresponds to amplitudes of pulses that result in the pulsed laser 206 (or the similar pulsed laser) producing light with the luminance under the second conditions.

In an embodiment where the interpolation factors in the lookup table 214 are indexed by luminance and temperature (e.g., the lookup table 214 is a two-dimensional table), the control circuitry 210 may perform the interpolation according to equation (1).

$$I(L)=(1-s)I_{LT}(L)+s \cdot I_{HT}(L) \quad (1)$$

In equation (1), I(L) is an amplitude of an electrical pulse that, when received by the pulsed laser 206 (or similar pulsed laser), causes such laser to produce light having the desired luminance, $I_{LT}(L)$ is the amplitude of an electrical pulse that, when received by the pulsed laser 206, causes such laser to emit light having the desired luminance under low temperature conditions, $I_{HT}(L)$ is the amplitude of an electrical pulse that, when received by the pulsed laser 206, causes such laser to emit light having the desired luminance under high temperature conditions, and s is the interpolation factor. As shown in equation (2) below, when the interpolation factor is indexed by junction temperature in the lookup table 214, the interpolation factor, s, may be derived for luminance and junction temperature by rewriting equation (1) as equation (2).

$$s(T, L) = \frac{I(T, L) - I_{LT}(L)}{I_{HT}(L) - I_{LT}(L)} \quad (2)$$

In an embodiment where the interpolation factors in the lookup table 214 are indexed by luminance, junction temperature, and pulse spacing (e.g., the lookup table 214 is a three-dimensional lookup table), the control circuitry 210 may perform the interpolation according to equation (3).

$$I(L)=(1-s)I_{LT,C}(L)+s \cdot I_{HT,F}(L) \quad (3)$$

In equation (3), I(L) is an amplitude of an electrical pulse that, when received by the pulsed laser 206, causes such laser to produce light having the desired luminance, $I_{LT,C}(L)$ is the amplitude of the electrical pulse that, when received by the pulsed laser 206, causes such laser to produce light having the desired luminance under low temperature and close (i.e., small) pulse spacing conditions, $I_{HT,F}(L)$ is the amplitude of the electrical pulse that, when received by the pulsed laser 206, causes such laser to produce light having the desired luminance under high temperature and far (i.e., large) pulse spacing conditions, and s is the interpolation factor.

Figure 4:
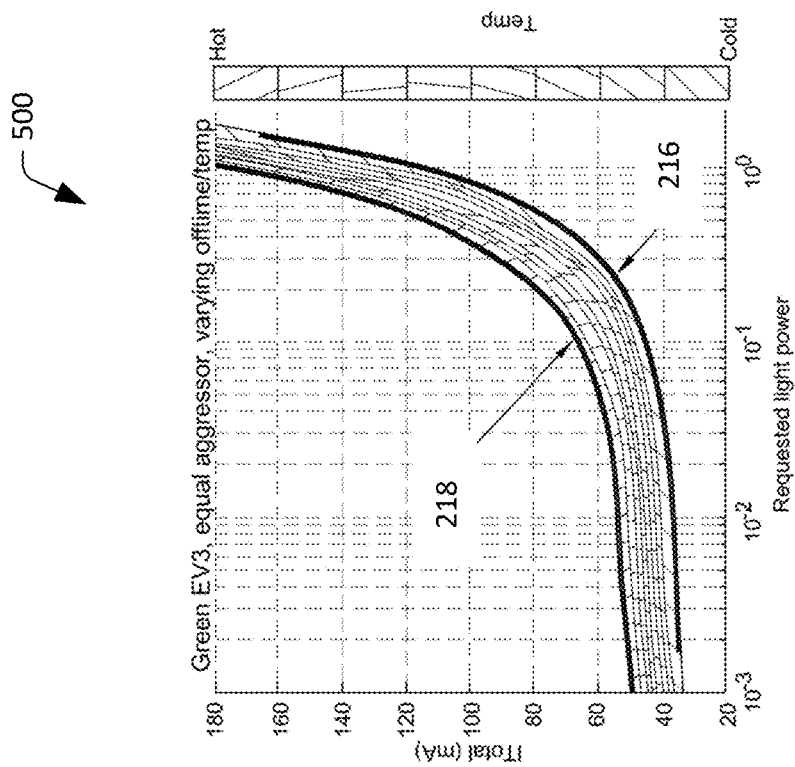
FIGS. 4 and 5 depict plots of curves that can be used to estimate pulse history effects with respect to light that is to be emitted by a pulsed laser.
Figure 5:
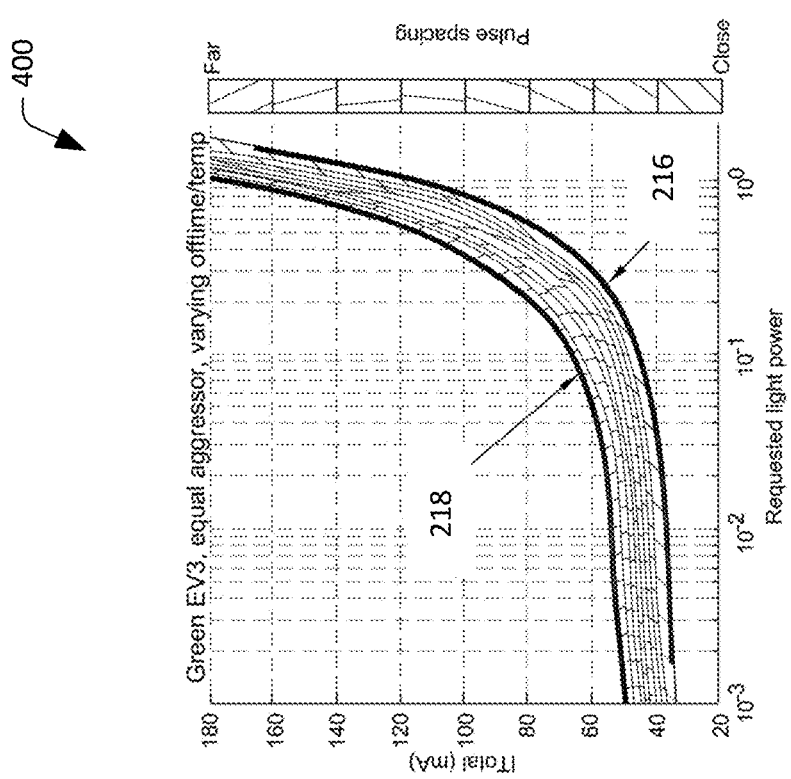

With reference briefly now to FIGS. 4 and 5, two plots (plot 400 and plot 500, respectively) are shown that illustrate the low threshold curve 216 and the high threshold curve 218. The first conditions associated with the low threshold curve 216 include a relatively low junction temperature (e.g., 15° C.) with a relatively small pulse spacing (e.g., 0.7 ns), whereas the second conditions of the high threshold curve 218 include a relatively high junction temperature (e.g., 65° C.) with a relatively large pulse spacing (e.g., 14.7 ns). With reference specifically to FIG. 4, the low threshold curve 216 and the high threshold curve 218 are illustrated in a plot of pulse amplitude versus requested luminance, with varying pulse spacing. With reference specifically to FIG. 5, the low threshold curve 216 and the high threshold curve 218 are illustrated in a plot of pulse amplitude versus requested luminance, with varying junction temperature.

Although not depicted in FIG. 2, it is to be understood that more than two curves may be stored in the memory 212. For instance, in an embodiment, the memory 212 may store four curves (e.g., the low threshold curve 216, a medium-low threshold curve, a medium-high threshold curve, and the high threshold curve 218) and the interpolation may be based upon each of the four curves.

Returning back to FIG. 2, for example, the memory 212 may further include a plurality of low-density curves 220 that are each produced under different conditions (e.g., different pulse spacing, different junction temperature, etc.). Similar to the low threshold curve 216 and the high threshold curve 218, the plurality of low-density curves 220 include values that are indexed according to luminance and pulse amplitude. The plurality of low-density curves 220 are less "dense" than the low threshold curve 216 and the high threshold curve 218. For instance, the low threshold curve 216 may comprise a first number of points and a curve in the plurality of low-density curves 220 may comprise a second number of points, wherein the second number of points is less than the first number of points. Thus, due to lower storage requirements of the low-density curves 220, the memory 212 is able to store a large number of curves. In an embodiment, the display system 200 may perform an interpolation between the low threshold curve 216, the high threshold curve 218, and some or all of the low-density curves 220 using the above-referenced interpolation factor. In another embodiment, the display system 200 may generate an estimate of the pulse history effects utilizing one of the plurality of low-density curves 220, and as such the display system 200 need not perform an interpolation. In yet another example, the memory 212 may be sufficiently large to store numerous curves at the same density as the curves 216 and 218 are stored. The memory 212 may also temporarily store parameters of pulses of electrical current that have been previously output by the pulse circuitry 204.

Operation of the display system 200 is now set forth. The display system 200 can be configured to display video imagery on the display surface 110. As such, the control circuitry 210 may receive a first indication from an external source (not shown in FIG. 2) indicating that first light is to be emitted by the pulsed laser 206. For instance, the first indication may comprise a desired luminance of the first light. Based upon the first indication, the control circuitry 210 controls the pulse circuitry 204 to output a first pulse of electrical current with a first amplitude using electrical current received from the current source 202. The pulsed laser 206 receives the first pulse and emits first light based upon the first pulse, wherein the first light is directed towards the mirror 208, which in turn directs the first light towards a desired (pixel) location on the display surface 110. The first light has (approximately) the desired luminance specified in the first indication. A first pixel in a frame of the video imagery has a color and luminance based upon the first light. The control circuitry 210 temporarily stores a parameter (e.g., pulse spacing, junction temperature, etc.) of the first pulse of electrical current in the memory 212.

The control circuitry 210 may receive a second indication from the external source (not shown in FIG. 2) indicating that second light is to be emitted by the pulsed laser 206. For instance, the second indication may comprise a desired luminance of the second light. The control circuitry 210 generates an estimate of pulse history effects upon the second light that is to be emitted by the pulsed laser 206 based upon a parameter (or more than one parameter) of the first pulse of electrical current and the desired luminance of the second light. For example, the control circuitry 210 can ascertain: 1) a value for pulse spacing between the first pulse and the second pulse; and 2) estimated temperature at the junction of the pulsed laser 206. The control circuitry 210, in an example, identifies an interpolation factor in the lookup table 214 based upon the value for pulse spacing, the estimated temperature at the junction of the pulsed laser 206, and the desired luminance. The control circuitry 210 then performs an interpolation between the low threshold curve 216 and the high threshold curve 218 based upon the interpolation factor and the desired luminance of the second light. The control circuitry 210 identifies, based upon the interpolation, an amplitude of the second pulse that, when provided to the pulsed laser 206 with the determined pulse spacing between the first pulse and the second pulse, causes the pulsed laser 206 to emit the second light with the desired luminance.

Based upon the estimate of pulse history effects, the control circuitry 210 controls the pulse circuitry 204 to output the second pulse of electrical current with the identified amplitude, wherein the identified amplitude is selected to correct for pulse history effects on the second light that is to be emitted by the pulsed laser 206. The pulsed laser 206 receives the second pulse of electrical current and, based upon the second pulse, the pulsed laser 206 emits the second light towards the mirror 208, which then directs the second light to a location on the display surface 110 that corresponds to a second pixel of the video imagery. As described above, the second light has the requested luminance specified in the second indication. The second light can be mixed with light from other pulsed lasers (controlled in a manner similar to that described above with respect to the pulsed laser 206) to cause the second pixel to have light with desired color and luminance. The aforementioned steps may be repeated such that pixels depicted on the display surface 110 have desired color and luminance.

Figure 6:
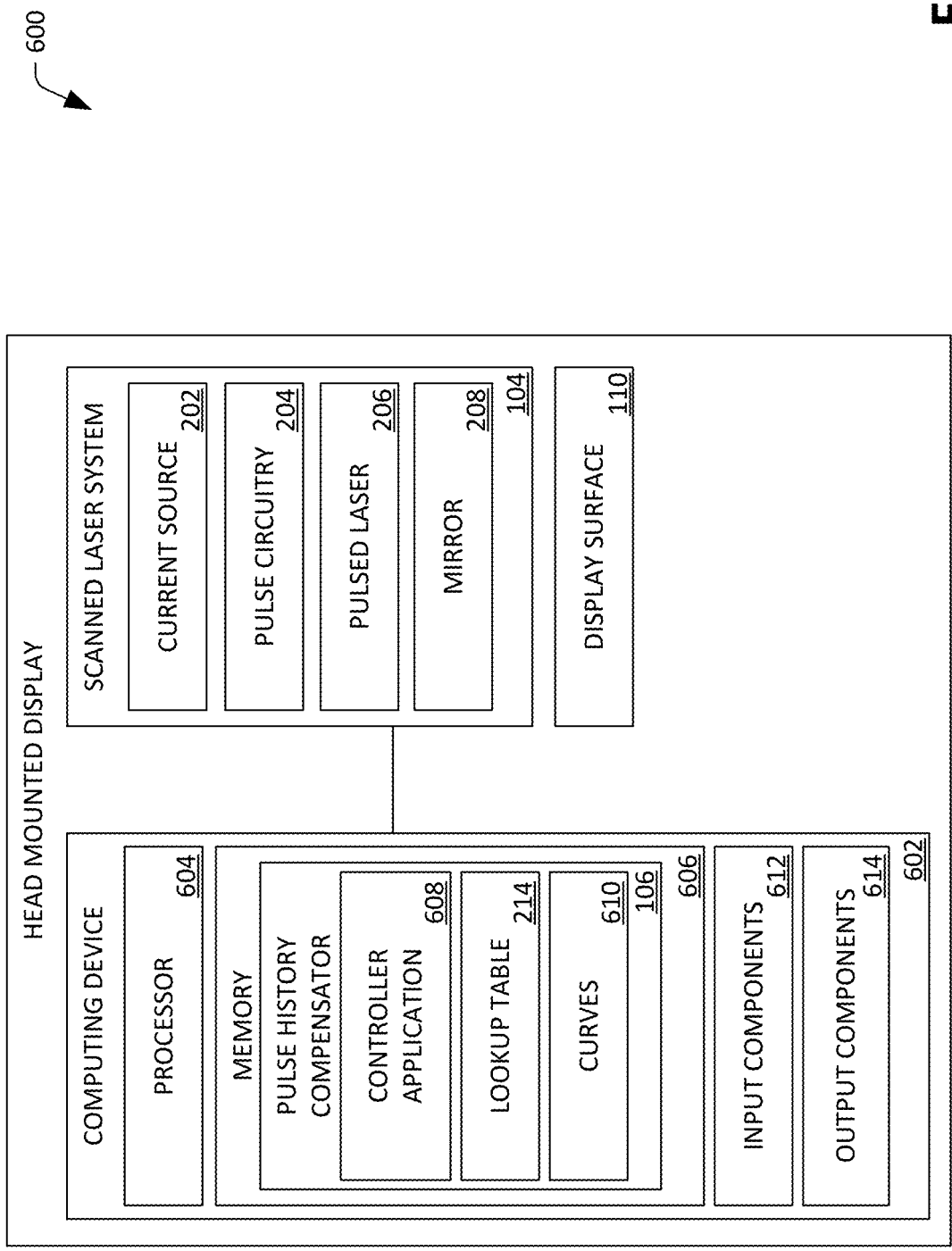
FIG. 6 is a functional block diagram of an exemplary display system that corrects for pulse history effects inherent to pulsed lasers.

Referring now to FIG. 6, a functional block diagram of an exemplary head mounted display 600 is illustrated, wherein elements of the head mounted display are configured to correct for pulse history effects of scanned laser systems. The head mounted display 600 may be a head-mounted device worn over eyes of a user. For instance, the head mounted display 600 may be VR headset or an AR headset. The head mounted display 600 comprises a computing device 602, the scanned laser system 104 and its respective components, and the display surface 110. The computing device 602 is in communication with the scanned laser system 104. The computing device 602 comprises a processor 604 and memory 606, wherein the memory 606 has the pulse history compensator 106 loaded therein. Hence, in the embodiment depicted in FIG. 6, the pulse history compensator 106 can be implemented in a general-purpose processor, a microprocessor, a microcontroller, etc. In another example, the pulse history compensator 106 can be implemented in programmable logic in a field programmable gate array (FPGA). In the head mounted display 600, the pulse history compensator 106 includes a controller application 608, the lookup table 214 (described above), and curves 610 (which include the curves 216 and 218) loaded therein. The controller application 608, when executed by the processor 604, is configured to control the pulse circuitry 204 of the scanned laser system 104 to output a pulse of electrical current that has a desired amplitude, pulse width, rise time, fall time, etc. The controller application 608 is further configured to generate an estimate of pulse history effects on light that is to be emitted by the pulsed laser 206 and to control the pulse circuitry 204 based upon the estimate of the pulse history effects such that light emitted by the pulsed laser 206 compensates for the pulse history effects. The curves 610 include the low threshold curve 216 and the high threshold curve 218, as well as optionally the plurality of low density curves 220.

The computing device 602 further includes input components 612 that enable the computing device 602 to receive input from a user of the and/or from surroundings of the head mounted display 600. For instance, the input components 612 may include a camera, a video camera, buttons, a handheld controller, a microphone, a mouse, a keyboard, a trackpad, a scroll wheel, etc. The computing device 602 also includes output components 614 that enable the user of the head mounted display 600 to experience sensory experiences. For instance, the output components 614 may include speakers, devices that provide tactile feedback, etc. Although not depicted in FIG. 6, the scanned laser system 104 (and its respective components) and the display surface 110 may be considered to be part of the output components 614.

The head mounted display 600 operates in a manner similar to that of the display system 200 described above in detail in the description of FIG. 2. However, rather than amplitude of pulses being controlled by circuitry in an ASIC (e.g., the control circuitry 210), a microcontroller (or programmable hardware logic) can be programmed with computer-executable instructions.

In operation, the controller application 608 causes the pulse circuitry 204 to output a first pulse of electrical current with a first amplitude based upon electrical current emitted from the current source 202. The pulsed laser 206 emits first light based upon the amplitude of the first pulse, wherein the first light is directed towards the display surface 110. Luminance of the first light is based upon amplitude of the first pulse. A first pixel is illuminated on the display surface 110 based on the first light, where brightness of the first pixel is based upon the luminance of the first light emitted by the pulsed laser 206. For instance, the first pixel may be part of a frame of the video imagery.

The controller application 608 generates an estimate of pulse history effects on second light that is to be emitted by the pulsed laser 206 subsequent to the first light being emitted by the pulsed laser 206. The estimate is generated based upon a parameter of the first pulse and a desired luminance of the second light (described above in the description of FIG. 2). In an example, the parameter may be a time between a trailing edge of the first pulse of electrical current and a leading edge of a second pulse of electrical current that is to be output by the pulse circuitry 204 (i.e., a pulse spacing between the first pulse and the second pulse). The estimate may be generated using the lookup table 214 and the curves 610 (described above in the description of FIG. 2).

The controller application 608 controls the pulse circuitry 204 to output a second pulse of electrical current based upon the estimate of the pulse history effects on the second light that is to be emitted by the pulsed laser 206. The pulsed laser 206 receives the second pulse and emits the second light towards the display surface 110, wherein the second light has the desired luminance (that is based upon an amplitude of the second pulse). A second pixel is illuminated on the display surface 110 based upon the second light, wherein brightness of the second pixel is based upon the luminance of the second light emitted by the pulsed laser 206, and further wherein the first pixel is part of the frame of the video imagery.

Figure 7:
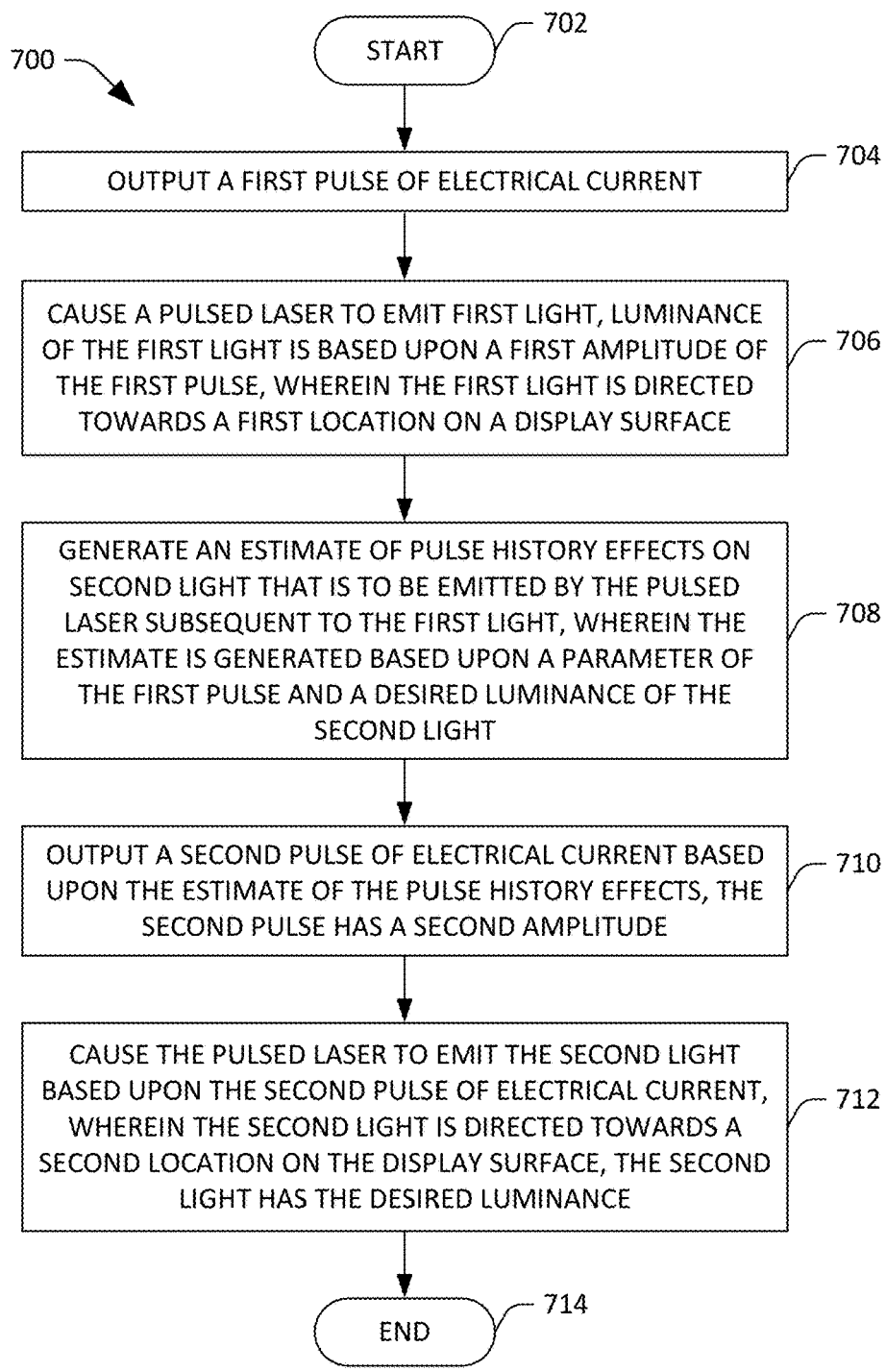
FIG. 7 is a flow diagram that illustrates an exemplary methodology performed by a display system for correcting for pulse history effects when outputting light.
Figure 8:
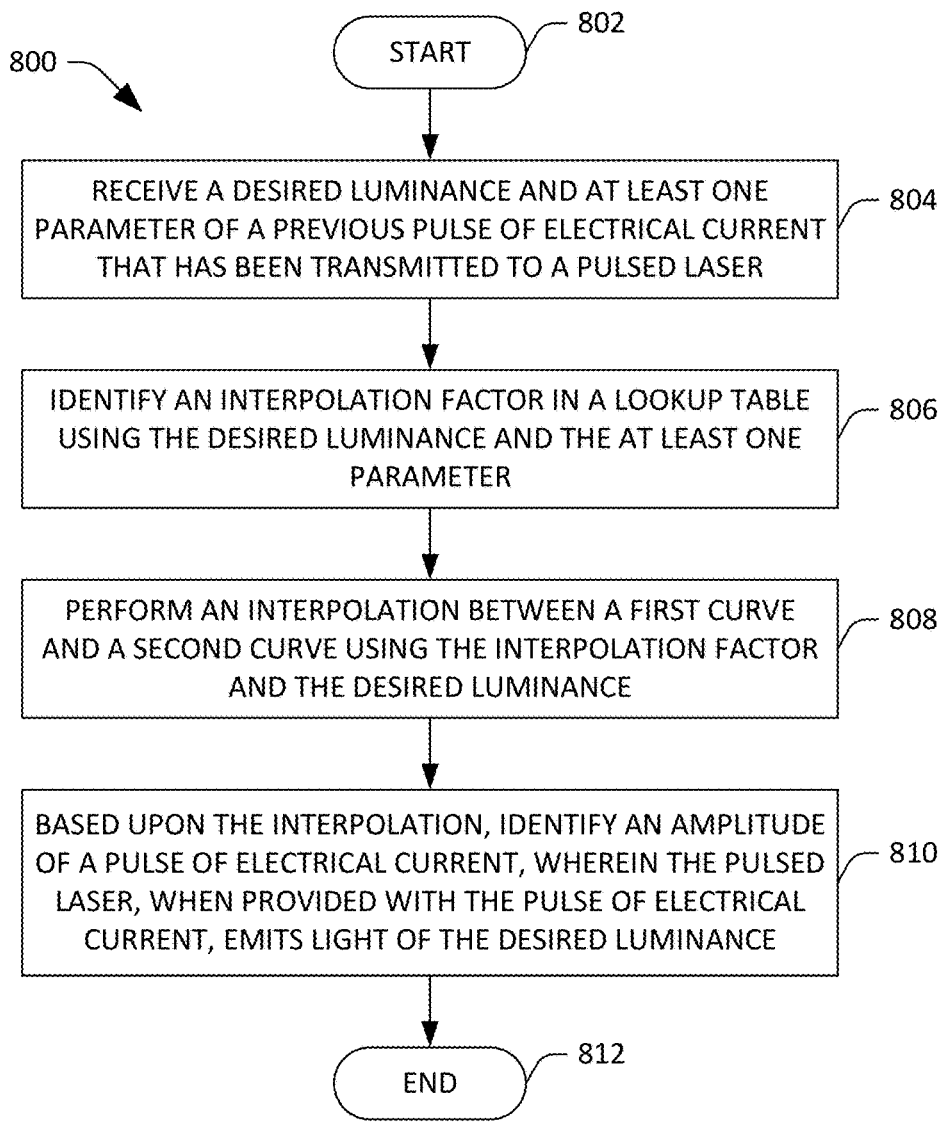
FIG. 8 is a flow diagram that illustrates an exemplary methodology performed by a display system for compensating for pulse history effects.

FIGS. 7 and 8 illustrate exemplary methodologies relating to compensating for pulse history effects in a scanned laser display. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like. In another example, one or more of the acts described herein may be performed by circuitry that is designed to perform such acts.

Referring now to FIG. 7, a methodology 700 performed by a display system that facilitates correcting for pulse history effects when outputting video imagery is illustrated. The methodology 700 begins at 702, and at 704, the display system outputs a first pulse of electrical current. At 706, the display system causes a pulsed laser to emit first light, wherein the first light is directed towards a first location on a display surface. Luminance of the first light is based upon a first amplitude of the first pulse of electrical current. At 708, the display system generates an estimate of pulse history effects on second light that is to be emitted by the pulsed laser subsequent to the pulsed laser emitting the first light. The estimate is based upon a parameter of the first pulse of electrical current and a desired luminance of the second light. At 710, the display system outputs a second pulse of electrical current based upon the estimate of the pulse history effects. The second pulse has a second amplitude. At 712, the display system causes the pulsed laser to emit second light, wherein the second light is directed towards a second location on the display surface that is different from the first location on the display surface. For instance, the second location can be adjacent the first location on the display surface, wherein the first location corresponds to a first pixel of a frame in the video imagery and the second location corresponds to a second pixel in the frame of the video imagery. The second light has the desired luminance (that is based upon the second amplitude of the second pulse of electrical current). The methodology 700 completes at 714.

Referring now to FIG. 8, a methodology 800 performed by a display system that facilitates compensating for pulse history effects is illustrated. The methodology 800 begins at 802, and at 804, the display system receives a desired luminance and at least one parameter (e.g., a pulse spacing, a temperature of a junction of a pulsed laser, and/or an amplitude) of a previous pulse of electrical current that has been transmitted to a pulse laser, wherein the pulsed laser has emitted previous light based upon the previous pulse. At 806, the display system identifies an interpolation factor in a lookup table using the desired luminance and the at least one parameter of the previous pulse. At 808, the display system performs an interpolation between a first curve and a second curve using the interpolation factor and the desired luminance. A first dimension of the first curve corresponds to requested luminance under first conditions. A second dimension of the first curve corresponds to amplitudes of pulses that, when provided to the pulsed laser, cause the pulsed laser to emit light with the requested luminance under the first conditions. A first dimension of the second curve corresponds to requested luminance under second conditions. A second dimension of the second curve corresponds to amplitudes of pulses that, when provided to the pulsed laser, cause the pulsed laser to emit light with the requested luminance under the second conditions. At 810, based upon the interpolation, the display system identifies an amplitude of a pulse of electrical current that, when provided to the pulsed laser, will cause the pulsed laser to emit light of the desired luminance. The methodology 800 concludes at 812.

EXAMPLES

To illustrate application of the above-described technologies, an experiment was performed using a green 820 μm Sharp™ model laser. Data in the experiment varied in pulse spacing from 0.7 ns to 14.7 ns and in junction temperature from 15° C. to 65° C. Data was taken in an "equal aggressor" scenario whereby an amplitude of a previous pulse was assumed to be equal to an amplitude of a pulse that was being considered. The correction of pulse history effects used 10° C. step size and 8 luminance values.

Figure 9:
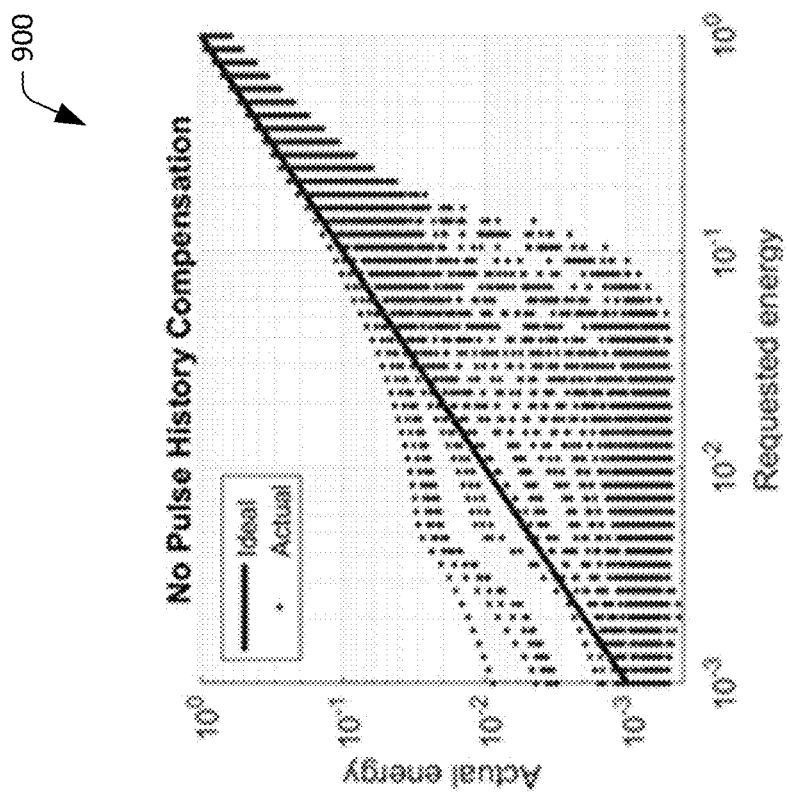
FIG. 9 is a plot of requested luminance versus actual luminance without pulse history effects compensation.

Referring now to FIG. 9, a plot 900 is illustrated that shows actual energy (i.e. actual luminance) vs. requested energy (requested luminance) when the above-described technologies were not utilized. In the plot 900, ideal behavior is shown by a diagonal solid line and actual behavior is shown by dots. As shown in the plot 900, failing to correct for pulse history effects causes relatively large errors in luminance.

Figure 10:
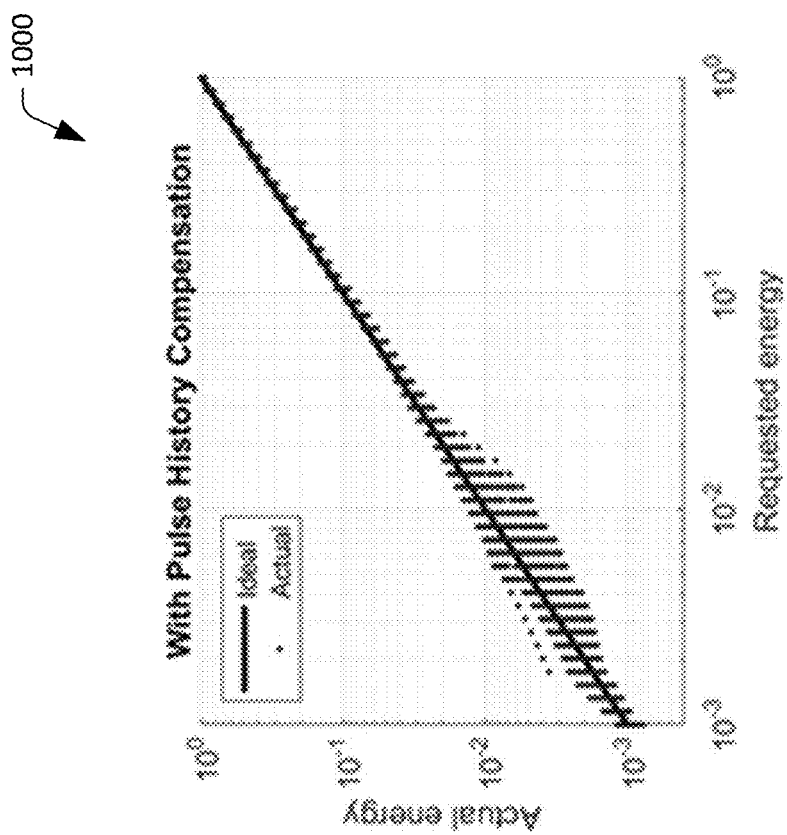
FIG. 10 is a plot of requested luminance versus actual luminance with pulse history effects compensation.

With reference now to FIG. 10, a plot 1000 is illustrated that shows actual energy (i.e. actual luminance) vs.

requested energy (requested luminance) when the above-described technologies were utilized. Similar to the plot 900, ideal behavior is shown by a diagonal solid line and actual behavior is shown by dots. As shown in the plot 1000, utilizing the above-described technologies reduces errors in luminance due to pulse history effects.

Figure 11:
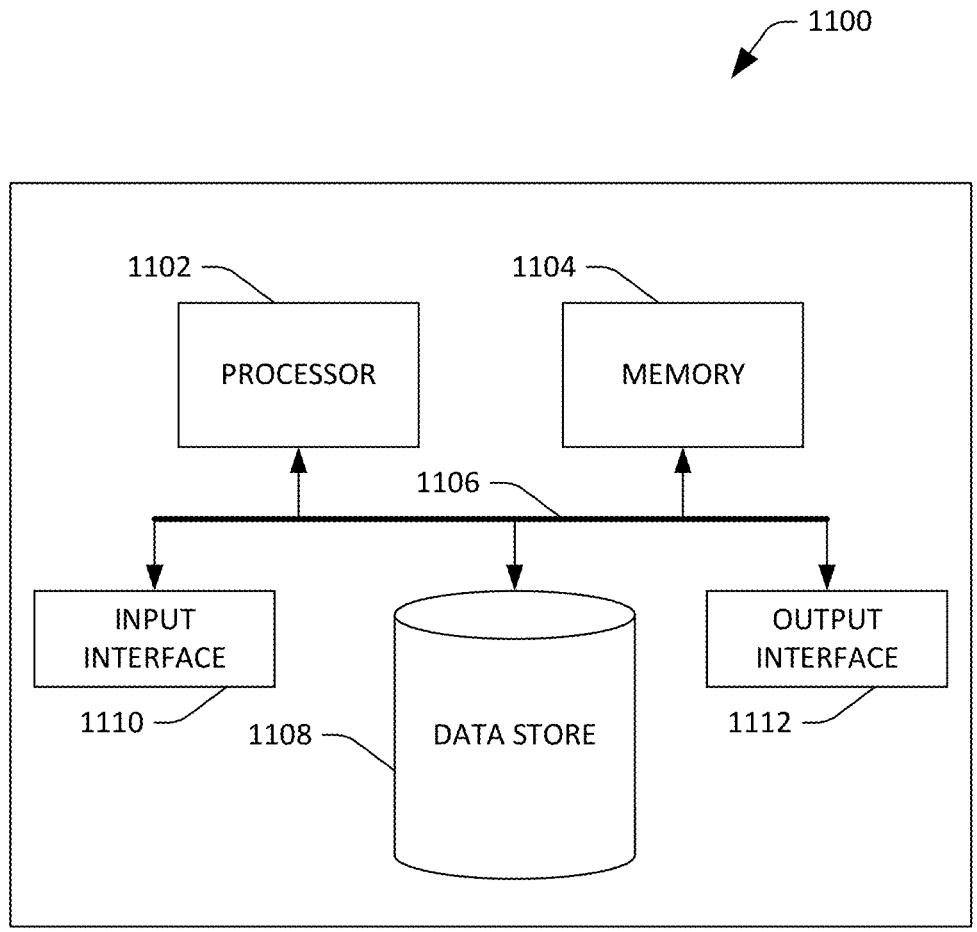
FIG. 11 is an exemplary computing device.

Referring now to FIG. 11, a high-level illustration of an exemplary computing device 1100 that can be used in accordance with the systems and methodologies disclosed herein is illustrated. For instance, the computing device 1100 may be used in a system that generates an estimate of pulse history effects. By way of another example, the computing device 1100 can be used in a system that outputs light on a display surface in connection with presenting video imagery on the display surface. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store curves, lookup tables, etc.

The computing device 1100 additionally includes a data store 1108 that is accessible by the processor 1102 by way of the system bus 1106. The data store 1108 may include executable instructions, curves, lookup tables, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A display system, comprising:
    a current source that is configured to emit electrical current;
    pulse circuitry that is configured to:
        receive the electrical current emitted by the current source; and
        output pulses of electrical current based upon the electrical current emitted by the current source;
    a pulsed laser that is configured to:
        receive a first pulse of electrical current output by the pulse circuitry; and emit first light in connection with presenting imagery on a display surface, wherein luminance of the first light is based upon a first amplitude of the first pulse of electrical current; and control circuitry that is configured to:
generate an estimate of pulse history effects on second light that is to be emitted by the pulsed laser subsequent to the pulsed laser emitting the first light, wherein the estimate is generated based upon a parameter of the first pulse and a desired luminance of the second light; and control the pulse circuitry based upon the estimate of the pulse history effects on the second light, wherein the control circuitry causes the pulse circuitry to output a second pulse of electrical current with a second amplitude, and further wherein the pulsed laser, when provided with the second pulse, emits the second light with the desired luminance in connection with presenting the imagery on the display surface.

2. The display system of claim 1, further comprising:
a microelectromechanical system that is configured to:
direct the first light to a first location on the display surface; and
direct the second light to a second location on the display surface.

3. The display system of claim 1, wherein the parameter comprises a time between a trailing edge of the first pulse and a leading edge of the second pulse.

4. The display system of claim 1, wherein the parameter comprises a temperature of a junction of the pulsed laser.

5. The display system of claim 1, wherein the parameter comprises the first amplitude of the first pulse.

6. The display system of claim 1, wherein the estimate of pulse history effects is based upon multiple parameters of the first pulse.

7. The display system of claim 6, wherein the multiple parameters comprise:
a time between a trailing edge of the first pulse and a leading edge of the second pulse; and
a temperature at a junction of the pulsed laser.

8. The display system of claim 1, wherein the display system is comprised by an augmented reality (AR) headset worn over eyes of a user of the AR headset.

9. The display system of claim 1, further comprising:
memory storing:
a first curve, wherein a first dimension of the first curve corresponds to requested luminance under first conditions, wherein a second dimension of the first curve corresponds amplitudes of pulses that, when provided to the pulsed laser, cause the pulsed laser to emit light with the requested luminance under the first conditions;
a second curve, wherein a first dimension of the second curve corresponds to requested luminance under second conditions, wherein a second dimension of the second curve corresponds to amplitudes of pulses that, when provided to the pulsed laser, cause the pulsed laser to emit light with the requested luminance under the second conditions; and
a table comprising interpolation factors, the interpolation factors in table are indexed by luminance and the parameter of the first pulse, wherein the control circuitry generates the estimate of the pulse history effects by:

identifying an interpolation factor in the interpolation factors based upon the desired luminance of the second light and the parameter of the first pulse;
performing an interpolation between the first curve and the second curve using the interpolation factor and the desired luminance of the second light; and
based upon the interpolation, identifying the second amplitude of the second pulse.

10. The display system of claim 1, wherein the pulsed laser is a red pulsed laser that emits red light, a green pulsed laser that emits green light, or a blue pulsed laser that emits blue light.

11. The display system of claim 1, wherein the control circuitry is an application specific integrated circuit (ASIC).

12. The display system of claim 1, wherein the display surface comprises a transparent material or a semi-transparent material.

13. A method performed by a display system for compensating for pulse history effects on light emitted by a pulsed laser, comprising:
outputting, by pulse circuitry of the display system, a first pulse of electrical current;
emitting, by the pulsed laser, first light based upon the first pulse of electrical current, wherein luminance of the first light is based upon a first amplitude of the first pulse of electrical current, and further wherein luminance of a first pixel on a display surface is based upon the first light;
generating an estimate of pulse history effects on second light that is to be emitted by the pulsed laser subsequent to the pulsed laser emitting the first light, wherein the estimate is generated based upon a parameter of the first pulse and a desired luminance of the second light;
outputting, by the pulse circuitry, a second pulse of electrical current based upon the estimate of the pulse history effects, the second pulse having a second amplitude; and
emitting, by the pulsed laser, second light based upon the second pulse of electrical current, the second light has the desired luminance, and further wherein luminance of a second pixel on the display surface is based upon the second light.

14. The method of claim 13, wherein the estimate is further generated based upon a parameter of a pulse of electrical current output by the pulse circuitry prior to the first pulse of electrical current.

15. The method of claim 13, wherein the parameter of the first pulse comprises:
a time between a trailing edge of the first pulse and a leading edge of the second pulse; and
an estimated temperature at a junction of the pulsed laser.

16. The method of claim 15, wherein the temperature at the junction of the pulsed laser is estimated based upon a temperature of an external surface of the pulsed laser.

17. The method of claim 13, wherein the first pixel and the second pixel are adjacent to one another.

18. The method of claim 13, wherein the estimate is generated by interpolating between a first curve and a second curve stored in memory based upon an interpolation factor, wherein the interpolation factor is indexed in a table by requested luminance and the parameter of the first pulse.

19. The method of claim 18, wherein the parameter of the first pulse is time between a trailing edge of the first pulse and a leading edge of the second pulse.

20. A head-mounted display system worn on a head of a user, comprising:

a display surface;

a current source that is configured to emit electrical current;

pulse circuitry that is configured to:
  receive the electrical current emitted by the current source; and
  output pulses of electrical current based upon the electrical current emitted by the current source;

a pulsed laser that is configured to:
  receive the pulses of electrical current output by the pulse circuitry; and
  emit light in connection with presenting video imagery on the display surface, wherein the light is based upon amplitudes of the pulses of electrical current; and control circuitry that is configured to:
  control the pulse circuitry to output a first pulse of electrical current that has a first amplitude, wherein the pulsed laser, when provided with the first pulse, outputs first light having a luminance, wherein the luminance of the first light is based upon the first amplitude;
  generate an estimate of pulse history effects on second light that is to be emitted by the pulsed laser subsequent to the pulsed laser emitting the first light, wherein the estimate is generated based upon a parameter of the first pulse and a desired luminance of the second light; and
  control the pulse circuitry based upon the estimate of the pulse history effects on the second light, wherein the control circuitry controls the pulse circuitry to output a second pulse of electrical current that has a second amplitude, and further wherein the pulsed laser, when provided with the second pulse, emits the second light with the desired luminance in connection with presenting the video imagery on the display surface.

* * * * *